May 2, 1950      F. J. PERILLO      2,506,168
PORTABLE FOLDING PROJECTION APPARATUS FOR FILM SLIDES
Filed July 10, 1946      3 Sheets-Sheet 1
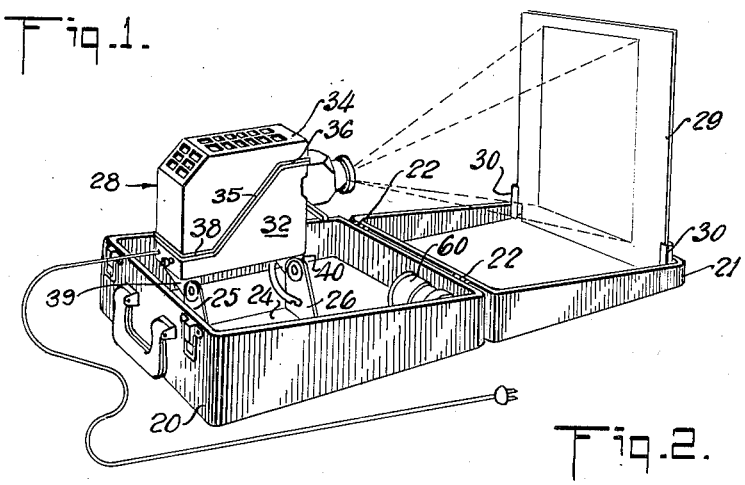
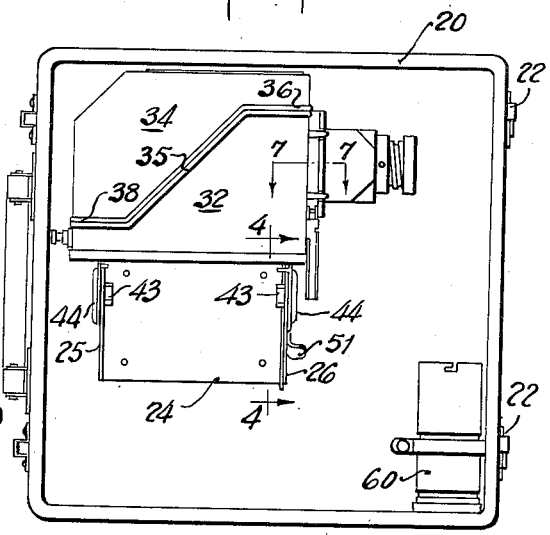
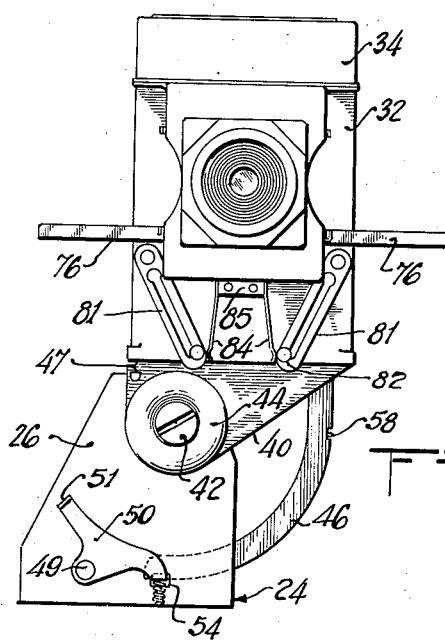
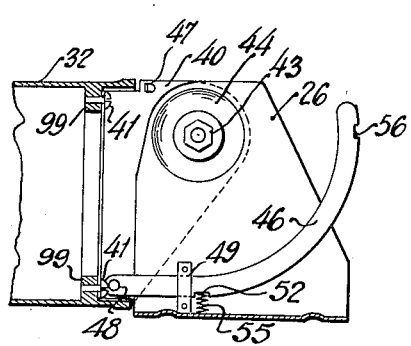

May 2, 1950  F. J. PERILLO  2,506,168
PORTABLE FOLDING PROJECTION APPARATUS FOR FILM SLIDES
Filed July 10, 1946  3 Sheets-Sheet 2
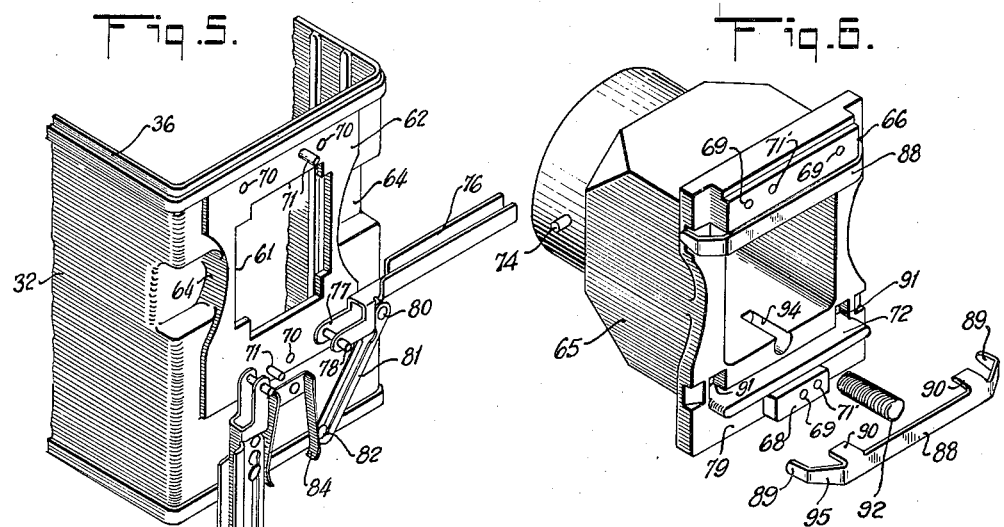
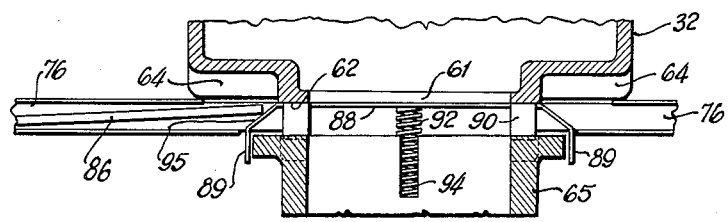
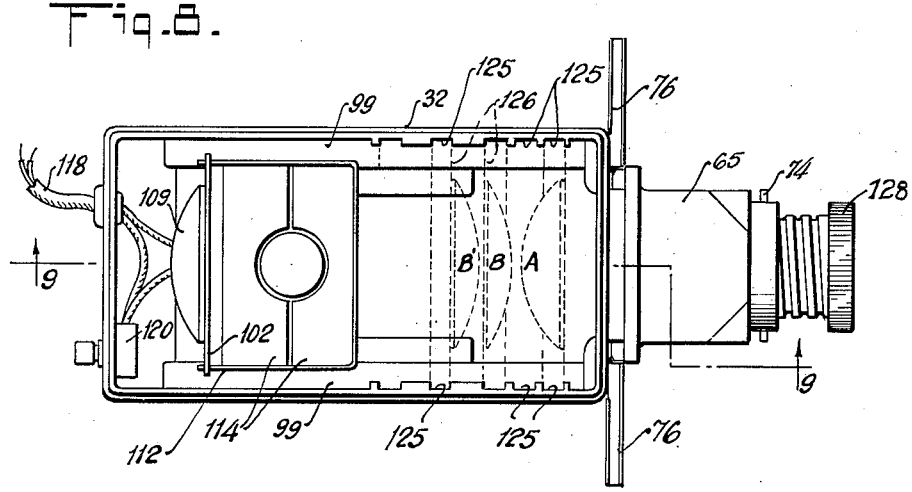
INVENTOR
Florindo J. Perillo
Williams, Rich & Morse
ATTORNEYS

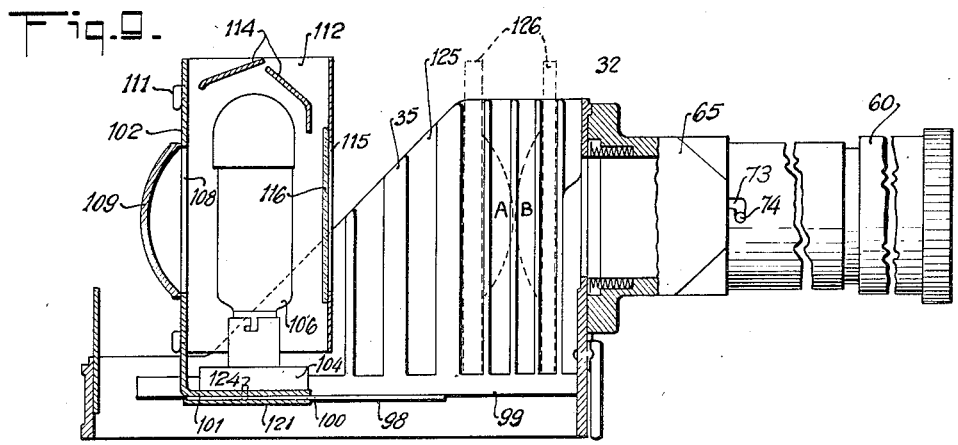
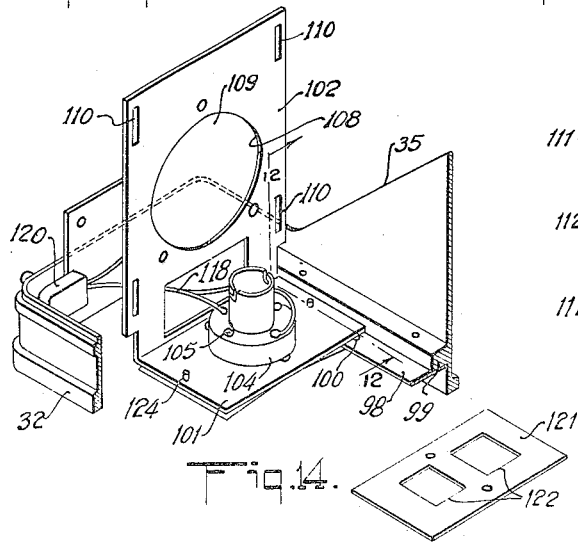
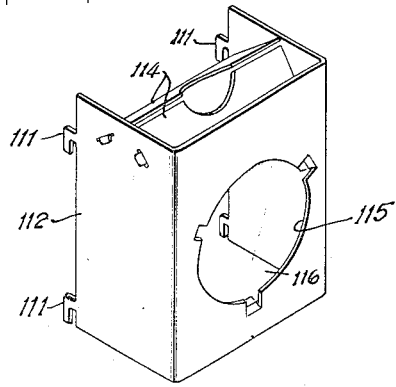
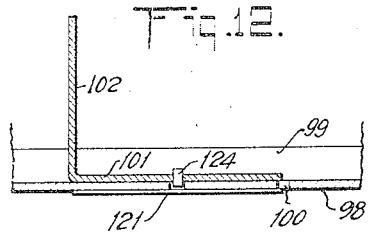
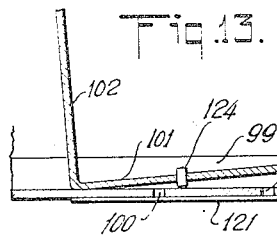

Patented May 2, 1950

2,506,168

UNITED STATES PATENT OFFICE 2,506,168

PORTABLE FOLDING PROJECTION APPARATUS FOR FILM SLIDES

Florindo J. Perillo, Jackson Heights, N. Y., assignor to Viewlex, Inc., Queens County, N. Y., a corporation of New York Application July 10, 1946, Serial No. 682,633

1 Claim. (Cl. 88—26)

This invention relates to apparatus for projecting transparencies on a screen in enlarged form. More particularly it relates to projection apparatus for film slides or film strips which is light, portable, self-contained and folds compactly into a carrying case and which is readily adaptable for the projection of images having a wide range of sizes by means of lenses of different focal lengths.

With the rapid development and popularity of still photography on 35 mm. film, which has taken place in recent years, there is now widespread use of film slides and film strips for projection purposes. Positive transparencies are made from 35 mm. negatives or by reversal processes and utilized in the form of film strips containing pictures in either "single-frame" or "double-frame" sizes, in both black and white and color. Or such positive transparencies are singly mounted in suitable holders which are generally 2 inches square and inserted individually into projection apparatus for producing enlarged images on a screen. Such individually mounted transparencies are referred to as film slides.

The pictorial method of presenting information makes film slide projectors useful in many fields such as education, vocational training, selling and amusement. They may be used for teaching in schools, industrial training, sales story presentation and in other obvious ways. These many possible uses make desirable highly adaptable projection apparatus which can be used not only for the projection of highly magnified pictures on screens in darkened rooms but also for projection of smaller pictures, for example 8 x 12 inches, with illumination sufficiently bright for use in a room under ordinary light conditions. The utility of projection apparatus which is completely self-contained and which can be rapidly set up without disturbing the arrangement of a room in a dwelling or office, to show projected images of a size sufficient to be clearly seen by a small group of people will be self-evident.

The principal objects of the present invention are:

(a) To meet the need for a completely self-contained projection outfit; and (b) To provide such an outfit in a carrying case which contains all the essential apparatus and which serves in itself as the support for projector and screen when in use.

Other objects and advantages will become apparent in the course of the following detailed description of the present preferred embodiment of the invention, taken in conjunction with the drawings, in which:

Fig. 1 is a perspective view of the complete projection outfit set up for use with a short focal length lens to project a picture substantially filling the viewing screen;

Fig. 2 is a top plan view of one half of the carrying case showing the projector in folded position;

Fig. 3 is a front elevation of the projector and its support, in erected position ready for use with the slide guides extended;

Fig. 4 is a rear elevation of the front portion of the projector support with a fragmentary section of the projector housing shown in folded position, taken on the line 4—4 of Fig. 2.

Fig. 5 is a fragmentary perspective of the front of the projector housing with the lens mount removed showing one slide guide in operative position and the other one folded;

Fig. 6 is a perspective of the lens mount detached from the housing and viewed from the left rear, one slide pressure bar and its spring being shown as removed slightly from their normal assembled positions;

Fig. 7 is a fragmentary horizontal section through the junction of housing and lens mount taken on the line 7—7 of Fig. 2;

Fig. 8 is a top plan view of the projector with the cover removed, the condenser lens carriers being shown in broken lines;

Fig. 9 is a vertical longitudinal section through the projector taken on the line 9—9 of Fig. 8;

Fig. 10 is a fragmentary perspective view, partly in section, of the rear portion of the projector housing showing the movable lamp support and the manner of mounting it in the housing;

Fig. 11 is a perspective view of the lamp chimney;

Fig. 12 is a detail section taken on the line 12—12 of Fig. 10;

Fig. 13 is a similar view showing the relative positions of the lamp support and associated parts when the support is being moved toward the rear; and Fig. 14 is a perspective view of the lamp support spring.

Subject matter disclosed in the drawings and hereinafter described but not claimed herein is claimed in my divisional applications Ser. No. 773,202, filed September 10, 1947 and Ser. No. 30,253, filed June 1, 1948.

Fig. 1 shows the complete projection apparatus of the invention which comprises a two-part carrying case having a lower section 20 and an upper section 21 hinged together along one edge by separable hinges 22. The depth of the two case parts at the hinge point is equal and the abutting side edges of the two case parts are preferably sloping as shown, so that the lower section is deeper. Secured to the lower section is a projector supporting member 24 having two upstanding brackets 25 and 26. A projector, generally indicated at 28, is pivotally mounted on said brackets and, when in the position shown, projects an image on a rigid screen 29 which stands upright in supports 30 which may be hinged or otherwise fixed to the upper section 21 of the case so that the screen may be folded flat inside the upper section of the case. The screen may be removable from the supports 30 so that it may be reversed, different types of surfaces being provided on opposite sides to satisfy the preferences of users.

The projector 28 has a two-part housing to contain the illumination system, consisting of the body portion 32 and a cover 34 which are preferably die castings. The cover is removable and the cover and body separate along a line which extends diagonally downward from front to rear throughout the major portion of the length of the housing, as indicated at 35, the line of division being horizontal at the front 36 and back 38. This construction provides a housing which has a relatively deep front portion and a relatively shallow rear portion, without regard to the space enclosed by the cover 34, for reasons which will be explained later.

Referring particularly to Figs. 3 and 4, the housing 32 is pivotally mounted on the brackets 25 and 26 through brackets 39, 40 which are attached as by screws 41 to the underside of the housing body 32. The brackets 26 and 40 at the front end are fastened together by means of a shouldered screw 42 and a nut 43. The portions of the brackets 26 and 40 surrounding the screw 42 are preferably dished, as shown at 44, so as to form substantial annular bearing or pivoting surfaces independent of the screw. The brackets 25 and 39 are fastened together in a like manner. The point of attachment of the brackets 39 and 40 to the brackets 25 and 26 is a substantial distance above the bottom of member 24, and the pivot points of the brackets 39 and 40 are offset from the center of housing 32 toward one side thereof, so that when the projector is turned on its side, as shown in Figs. 2 and 3, it lies flat against the bottom of the case and when erected into the position shown in Fig. 3, it is elevated sufficiently so that the axis of its lens is approximately opposite the center of screen 29.

Locking means are provided, for maintaining the projector in its folded or upright position, including a flat arcuate bar 46, the curve of which has the center of screw 42 as its center. This bar is pivotally attached to the inside front portion of the body 32 of the housing, as shown at 48 in Fig. 4 and slides through a cleat 49 secured to the bracket 26 on its inner side. Pivotally mounted at 49 on the outer face of bracket 26 is a lever 50 having a thumb piece 51 and a catch 52, the latter extending through an opening 54 in bracket 26. Under the edge of bar 46 a spring 55 urges the catch 52 upward toward the bar 46 and the latter is provided with two notches 56 and 58 which engage the catch 52 to hold the projector in either position. A lug 47 punched out at right angles from bracket 40 engages the top edge of bracket 26 when the projector is upright and acts as a stop, making the structure more rigid.

As may be seen in Fig. 2, when the projector is in its folded position there is ample space remaining in the case for auxiliary lenses such as the lens 60 and for the storage of film slides and the like.

Referring particularly to Figs. 5, 6 and 7, the front end of the housing 32 is provided with an aperture 61 through which the light passes to the film slide, this aperture being surrounded by a flat, smooth surface 62. The face of the housing 32 is indented at either side of the aperture 61, as shown at 64, so that a single film slide may be pushed into centered position with respect to the aperture, the indentation 64 providing space for the user's fingers. A lens mount 65, which is also preferably a die casting, is provided which has on its rear surface an upper block 66 and a lower block 68 having tapped holes 69 to receive screws. Corresponding clearance holes 70 are provided at the top and bottom of the flat portion 62 of the housing 32. The lens mount may be centered on the front of the housing by means of locating pins 71 which enter holes 71' in the lens mount, which is then secured in place by screws passing through the holes 70 and into the holes 69. When the lens mount is in position on the housing there is a space between it and the housing defined at the top by the block 66 and at the bottom by a flat ledge 72, which may, if desired, be continuous with the lower block 68. Through this space the film slides or other form of transparencies are introduced in front of the light coming through the aperture 61. The front end of the lens mount may be constructed in any manner desired so as to adjustably receive various types of lenses which may either be threaded into an aperture in the front of the mount or coupled to the outside by means of bayonet slots 73 cooperating with pins 74, as shown in Fig. 9.

The means for guiding and holding film slides in position in front of the aperture 61 and in line with the lens axis consist of folding slide guides and spring-actuated pressure bars which will now be described. The folding slide guides consist of right and left-hand members, best shown in Fig. 5, formed of sheet metal bent into the shape illustrated and having channel portions 76 integral with bifurcated end portions 77 perforated to slip over pins 78. When the lens mount is in position, pins 78 and portions 77 are beneath the ledge 72 of the lens mount and the bottoms of channel portions 76 are in alinement with the upper surface of ledge 72. The pins 78 are set into the face of the housing 32 and are of such length that their outer ends are in contact with the face 79 of mount 65. Pivotally attached to each slide guide at 80 are slotted links 81 which operate over fixed headed pins 82 fastened to the housing 32. A spring 84 with two leaves pushes the links against the pins so that the offset ends of the slots in the links lock the links in the extended position shown in Fig. 3. The spring 84 has a bridge portion 85 attached to the housing by rivets or the like. It will be apparent that by pressing links 81 toward spring 84 the slide guides may be released and lowered into the vertical position shown at the left in Fig. 5. As shown in Fig. 7, with the slide guides in their operative or horizontal position, they will support a slide 86 as it is introduced into or ejected from the projection position before the aperture 61.

When the slide is in projection position, it is held flat against the surface 62 of the housing so as to be in the focal plane of the lens. This is accomplished by means of a pair of pressure bars 88 which are of the shape best shown at the lower part of Fig. 6. Their ends are first bent at an obtuse angle to their principal surface and again bent to terminate in tongues 89 which closely surround a portion of the lens mount and prevent lateral movement of the bars. On one edge of each bar 88 are two tongues 90 which enter apertures 91 formed in the lens mount. These apertures are sufficiently deep so that the bar may move away from the face 62 of the housing to permit the passage of a slide and they serve to prevent vertical movement of the pressure bars. Coil springs 92, seated in recesses 94 in the lens mount bear against the centers of the bars and urge them toward the face 62 to engage the slides at top and bottom. As shown in Fig. 7, on being introduced into the projector, the slide 86 first engages the angular faces 95 of bars 88 and forces them away from the face 62 of the housing against the pressure of springs 92. Since the bars 88 are symmetrical at their ends, slides may be introduced from either side.

Referring now to Figs. 8–14, the movable lamp support structure will now be described. Extending inwardly from each side of the housing 32 at the bottom thereof are two parallel flat rails 98 fastened to ribs 99 formed on the housing. The rails are preferably provided with spaced perforations 100. Resting on the upper surface of the rails is a sheet metal member having a base 101 and a back 102 at right angles thereto. Centrally secured to the base is a lamp socket 104 secured by screws 105 and supporting a lamp 106. The back 102 contains a central aperture 108 behind which is a reflector 109. At the edges of the back are four slots 110 to receive hooks 111 formed on a lamp chimney 112 which has the usual light baffles 114 and an aperture 115 in the front across which may be secured a heat absorbing glass 116. It will be understood that light emanating from the lamp 106 is concentrated by the reflector 109 and emitted through the aperture 116 in the direction of the aperture 61. The lamp 106 is supplied with current through wires 118, a switch 120 being interposed in the circuit.

To removably secure the above described assembly to the rails 98, the flat spring 121, shown in Fig. 14, is centrally secured to the base 101 with its outer edges underlying the rails 98. This spring preferably contains apertures 122 to provide space for and give access to the nuts which secure the screws 105 to the base 101. These screws may pass through slots (not shown) in the base to permit centering of the lamp before the reflector 109 in the usual manner, and the apertures 122 are sufficiently large to accommodate this adjustment.

The base 101 is provided at either side with fixed pins 124 which cooperate with the apertures 100 in the rails 98 to hold the lamp 106 in various positions. Referring to Figs. 12 and 13, it will be seen how this construction serves to fix the position of the lamp so that it cannot be moved accidentally and yet makes it easy to shift the lamp position when desired. Normally the spring 121 holds the base 101 flat against the rails 98 with the pins 124 in a pair of apertures 100. If it is desired to move the lamp to the rear one merely grasps the edges of the back 102 at a point above the base 101 and pulls it rearwardly. This force acts first to tilt the base 101, as shown in Fig. 13, which withdraws the pins 124 from the apertures 100, flexing the spring 121. The base 101 is then slid along the rails until the pins drop into the next pair of apertures. To move the lamp in the opposite direction, the force is applied in the same way so as to move the lamp toward the front of the housing, the base tilts in the opposite direction and the pins are similarly withdrawn from the apertures in which they are resting so that the base can be moved forward.

Referring to Figs. 8 and 9, the relatively deep forward part of the housing 32 which is produced by the diagonal division between the housing and the cover 34 is provided on the inner surfaces of its sides with a plurality of vertical guideways or slots 125 which are open at the top and extend downwardly as far as the rails 99. These slots receive slides 126 carrying condenser lens elements, which are shown in broken lines since the condenser elements may be arranged in any desired combinations and in various relations to the position of the lamp 106 for the purpose of concentrating the light rays at the desired point with reference to the particular lens inserted in the mount 65. For example, the condenser lens arrangement shown in Fig. 8 is suitable for use with a lens 128 of 2" focal length which is used to project a picture on the screen 29 in the position shown in Fig. 1, condenser elements A, B and B' being used in the positions shown. However, it may be desired to use the same projector with a lens 60 of 5" focal length, for example, to project an image across a room onto a large screen. This lens will require the concentration of the light at a different point and the condenser system may quickly be altered to suit the requirement of this lens by shifting the slides 126 to give the arrangement shown in Fig. 9 in which only the lenses A and B are used but reversed in position, the lens B' being omitted. It will be evident that a wide range of condenser arrangements may be produced by using a set of slides 126 carrying condenser elements of different optical characteristics and that by this means, together with the readily shiftable lamp position, the illumination may be adjusted to meet the requirements of a wide variety of lenses. It is also contemplated that instead of mounting the heat-absorbing glass 116 on the lamp chimney 112 it may likewise be carried in a slide 126 and placed in one of the slots 125 so as to be readily removable. This construction greatly facilitates the cleaning of the several optical elements of the illumination system.

The shallow rear portion of the housing 32 makes the lamp, lamp chimney and associated parts very accessible when the cover 34 is removed and facilitates changing or adjusting the lamp, cleaning the reflector and moving the lamp support structure to the desired position.

It will thus be seen that the various novel features, elements and combinations described above provide a highly versatile projector which is compact, easily portable and adaptable to numerous uses under varying conditions. While the invention has been described as embodied in a projector particularly adapted for use with film slides, it may be used with other forms of transparencies such as film strips merely by the use of suitable adapters. In view of the obvious possibility of changes in many of the details and the possible substitution of equivalents, the foregoing detailed description is to be treated as merely illustrative of the invention which is defined in the appended claim.

What is claimed is:

Portable, self-contained picture projection apparatus comprising a carrying case having upper and lower sections, each section having a flat panel and upstanding marginal side walls, said sections being hinged together, the side walls at the hinged edges being of equal height, the adjacent side walls of the lower section sloping upwardly and the adjacent side walls of the upper section sloping downwardly, said upper section having screen supporting means attached thereto adjacent its side wall which is opposite its hinged edge, a rigid screen held by said supporting means in position to receive a projected picture and adapted to lie flat against the inside of the panel of said upper section, a projector having a lens and pivotally attached to the inside of the panel of said lower section, the pivotal axis being spaced above the panel and offset from one side of the projector by substantially equal amounts whereby in folded position the projector lies on its side against the panel to which it is attached, the spacing of said axis above the panel being such as to bring the lens of said projector opposite the center of said screen when the projector is in erected position, and releasable means for securing the projector in the latter position.

FLORINDO J. PERILLO.

REFERENCES CITED

The following references are of record in the file of this patent:

UNITED STATES PATENTS

| Number | Name | Date |
|---|---|---|
| 297,851 | Roche | Apr. 29, 1884 |
| 1,186,192 | Hoffman | June 6, 1916 |
| 1,196,924 | Bothwell | Sept. 5, 1916 |
| 1,199,733 | Dietz | Sept. 26, 1916 |
| 1,305,406 | Peterson | June 3, 1919 |
| 1,370,842 | Reeves | Mar. 8, 1921 |
| 1,618,773 | Meyers | Feb. 22, 1927 |
| 1,849,151 | Ott | Mar. 15, 1932 |
| 2,026,478 | Lisintzki | Dec. 31, 1935 |
| 2,132,716 | Wittel | Oct. 11, 1938 |
| 2,172,256 | Nagel | Sept. 5, 1939 |
| 2,199,305 | Dewey | Apr. 30, 1940 |
| 2,231,395 | Schlegel | Feb. 11, 1941 |
| 2,249,116 | Corless | July 15, 1941 |
| 2,259,651 | McClure | Oct. 21, 1941 |
| 2,326,657 | Johnson | Aug. 10, 1943 |
| 2,345,202 | Larson | Mar. 28, 1944 |

FOREIGN PATENTS

| Number | Country | Date |
|---|---|---|
| 545,711 | France | July 28, 1922 |